United States Patent [19]
Otto

[11] Patent Number: 5,299,259
[45] Date of Patent: Mar. 29, 1994

[54] DISTRIBUTING CALLS OVER SERVING CENTERS OF A LARGE CUSTOMER

[75] Inventor: Mary R. Otto, Lisle, Ill.

[73] Assignee: AT&T Bell Laboratories, Murray Hill, N.J.

[21] Appl. No.: 766,870

[22] Filed: Sep. 27, 1991

[51] Int. Cl.$^5$ .................... H04M 7/00; H04M 15/00; H04M 3/42; H04Q 3/64

[52] U.S. Cl. .................... 379/221; 379/113; 379/207; 379/212; 379/266

[58] Field of Search ............ 379/113, 220, 221, 265, 379/266, 309, 219, 207, 212

[56] References Cited

U.S. PATENT DOCUMENTS

| | | | |
|---|---|---|---|
| 4,048,452 | 9/1977 | Oehring et al. | 179/27 D |
| 4,400,587 | 8/1983 | Taylor et al. | 179/27 D |
| 4,800,583 | 1/1989 | Theis | 379/67 |
| 4,893,328 | 1/1990 | Peacock | 379/67 |
| 4,907,260 | 3/1990 | Prohs et al. | 379/224 |
| 4,951,310 | 8/1990 | Honda et al. | 379/266 |
| 4,953,204 | 8/1990 | Cuschleg, Jr. et al. | 379/309 X |

OTHER PUBLICATIONS

"Pinnacle ™ ACD/MIS, Marketing Applications Guide", AT&T Network Systems, Apr. 1991, pp. 4-1-0-4-12.

"5ESS ® Switch ACD/MIS, Telemarketing Services Application Guide", AT&T Network Systems, Aug. 1990, pp. 15, 16 and 54-58.

W. Ulrich et al., "Translations in the No. 1 Electronic Switching System", *The Bell System Technical Journal*, vol. 43, No. 5, Part 2, Sep. 1964, pp. 2533-2573.

*Primary Examiner*—James L. Dwyer
*Assistant Examiner*—Harry S. Hong
*Attorney, Agent, or Firm*—Werner Ulrich

[57] ABSTRACT

This invention relates to apparatus and methods for sharing traffic among a plurality of ACD sites serving a customer. Each ACD site has a main queue for storing incoming calls to that ACD, and a group of overflow queues for storing calls rerouted from one of the other ACD sites. Before rerouting a call to an alternate site, the overflow queue for that site is checked; if it has an excessive number of entries, calls will not be rerouted to that alternate site. If one of the ACD sites is not appropriately equipped with overflow queues for different sites and an appropriate program for steering calls, that ACD site can route its overflow traffic via one of the ACD sites, designated as a mother node, for distributing overflow from the one site to others.

16 Claims, 6 Drawing Sheets

DISTRIBUTING CALLS OVER SERVING CENTERS OF A LARGE CUSTOMER

CROSS-REFERENCE TO RELATED APPLICATION

This application relates to an application by Daniel C. Kerrigan and Mary R. Otto entitled "ACD Multiflow Network Call Distribution" filed Jul. 30, 1991, Ser. No. 738,003, and assigned to the same assignee as this application.

TECHNICAL FIELD

This invention relates to automatic call distributors (ACDs) or Private Branch Exchanges (PBXs) and, more specifically, to arrangements for sharing traffic among a group of such entities.

Problem

Businesses frequently serve their customers through the use of automatic call distributor (ACD) answering sites which allows incoming calls, for example, for placing orders, to be routed to one of a plurality of agent positions for handling each call. In many cases, it is advantageous for a business to have several different ACD answering sites separated from each other for handling the overall needs of the business. The ACD sites may be separated from each other in order to draw on different populations for staffing the site or to be responsive to the special requirements of different regulatory agencies which control different areas of the country. When a single customer has several ACD sites, it is desirable to create an arrangement whereby overflow traffic to one of these ACD sites is handled by the agents of one of the other ACD sites that may be less busy.

Arrangements for handling such overflow exist in present systems such as the system described in M. P. Taylor et al.: U.S. Pat. No. 4,400,587. A problem with such an arrangement is that the control of rerouting of traffic is performed on the basis of an off/on trigger, not on the basis of a call by call examination of the expected delay in serving a call. For some situations such as night transfer, this is satisfactory but for the handling of overflow traffic, the result is that calls are answered with widely varying delay in the answer, with the result that some of the calls that are delayed excessively are abandoned, and others answered out of turn. A second problem is that these systems reroute calls after having first delayed them, thus causing such calls rerouted calls to encounter excessive delay.

Some systems are arranged to communicate only with similar types of ACD switches. For example, a Rockwell Galaxy ® ACD may communicate with another Galaxy ACD via control messages to determine if the second ACD is capable of accepting additional traffic. However, if the second ACD is not a Rockwell ACD but is, for example, an ACD served directly by an AT&T 5ESS ® switch, no arrangements have been made for communications between such switches. If the ACDs are connected by dedicated trunks, an expensive arrangement for handling occasional overflow traffic, then the availability of these trunks can be used as an indicator of the activity of other ACDs. The control messages only give an indication at one point in time of the ability of the other ACD to accept traffic. Further, the control messages require the use of a dedicated trunk, which is expensive.

These arrangements are particularly awkward when several ACDs attempt to handle overload that may exist in any one or more of the ACDs. First, any ACD must have a signaling trunk to any other ACD to which it may send traffic. Second, the time required for transmitting an inquiry message and receiving a response message is on the order of ten seconds so that if several different inquiries need to be made, a great deal of time is lost and a large amount of overflow traffic has been accumulated.

Accordingly, a problem in the prior art is that there is no good way of sharing overload among a group of ACD sites that is cost effective, allows for quick response to overload, and that is flexible and easily controllable by ACD system administrators.

A further problem exists if one or more of the ACD sites is a site having limited capability for program modification. This type of situation will occur, for example, if the bulk of the sites are made by one manufacturer and are adapted through program means to solve the problem stated above, but one or more of the sites, perhaps already being in place, are made by another manufacturer whose products are not so adapted.

Solution

The above problem is solved and an advance is made over the prior art in accordance with the principles of this invention wherein the presence of overflow traffic is detected in the queues for storing incoming traffic to an ACD and, upon the detection of overflow, calls are rerouted to other ACDs of a group serving a specific customer; in a departure from the prior art, the calls are rerouted on the basis of information concerning traffic that has been rerouted from the target ACD to the sending ACD. Advantageously, only the rerouted calls and no special messages are transmitted between ACD sites.

Overflow in a sending ACD is determined by estimating the amount of time that an incoming call will be in a queue before being served by an ACD agent. In accordance with one specific implementation of this invention, this estimate is based on the number of calls in the queue and a running average, constantly updated, of the amount of time that agents spend on each call. Advantageously, such an estimate is more accurate than an alternative, the age of the oldest call in the queue; for example, that oldest call may be the first of a large block of calls which enter the system almost simultaneously so that this first call may be in the queue for only a short time but the last call of that block and any new calls will be in the queue for a long time before they are processed.

If the estimated time that a call is expected to be in the queue before the call is answered by an agent exceeds a parameter, preferably controllable by the ACD system administrator, an attempt is made to reroute the call to one of the other ACD answering sites of the customer. In selecting an alternate answering site, the sending ACD site queries its own incoming traffic rerouted from other answering sites in a predetermined but changeable order. If the amount of traffic in the queue of a candidate alternate answering site has fewer than a predetermined number of entries, then calls are rerouted to that alternate answering site. In one specific implementation, calls are rerouted only if that queue is actually empty.

In accordance with one aspect of the invention, if calls are rerouted to an alternate answering site and the alternate answering site cannot accept such calls, i.e., its calls would encounter more than the upper limit of delay if such a call were accepted, the alternate answering site reroutes the call back to the original ACD over a public switched network using a special directory number. An ACD which receives a call having this special directory number, recognizes that no calls can be overflowed to the sending ACD until all overflowed traffic from the alternate ACD serving site has been handled. Advantageously, by using a different directory number for rejected calls as opposed to overflowed calls, we avoid the situation of repeatedly or further rerouting rejected calls; further, since these rejected calls cannot be further rejected but must enter the overflow queue for the rejecting ACD site, we ensure that the sending ACD is properly informed that the target alternate ACD cannot accept traffic at this time.

The second problem stated in the Problem section is solved according to the principles of this invention and in a departure from the prior art by assigning one of the nodes which is being adapted by program means, in accordance with the principles of this invention, to act as a mother node and to accept all overflow traffic from an ACD which has not been adapted in accordance with the principles of this invention, labeled for simplicity a foreign node. If, as is usually the case, the foreign node is capable of rejecting traffic by overflowing the traffic then the mother node can send its own overflow traffic to the foreign node as described above; if too many calls are overflowed by the foreign node, this is an indication to the mother node that overflow traffic should not be routed to the foreign node until the foreign node is again able to accept such overflow traffic. If the mother node receives overflow traffic from the foreign node, it may either process such overflow traffic in the ACD of the mother node or it may overflow the overflow traffic from the foreign node to one of the other nodes adapted in accordance with the principles of this invention. If this other node rejects the call, then the call is returned to the mother node which, since the foreign node is assumed not to be adapted to receive reject traffic and is not able to reaccept traffic which has already been overflowed. The traffic from the foreign node which has been overflowed to one of the other nodes but rejected is traffic, which if it had originated from one of the other nodes, would have to be handled by that other node. The mother node is engineered to accommodate this overflow traffic as well as other traffic.

In accordance with one aspect of the invention, queues are provided in the mother node not only for overflowing traffic from a foreign node but also for storing overflowed traffic from the foreign node that was sent to one of the other nodes and rejected therein. Advantageously, the priority for traffic in such nodes may be adjusted accordingly in priority. Also, for calls overflowed to the foreign node, a program in the mother node provides the intelligent routing to the mother node team or the appropriate alternate site.

Separate queues can also be provided in the alternate nodes for traffic overflowed from the foreign node, via the mother node, to the alternate node. Such separate queues aid in system administration.

DETAILED DESCRIPTION

Figure 1:
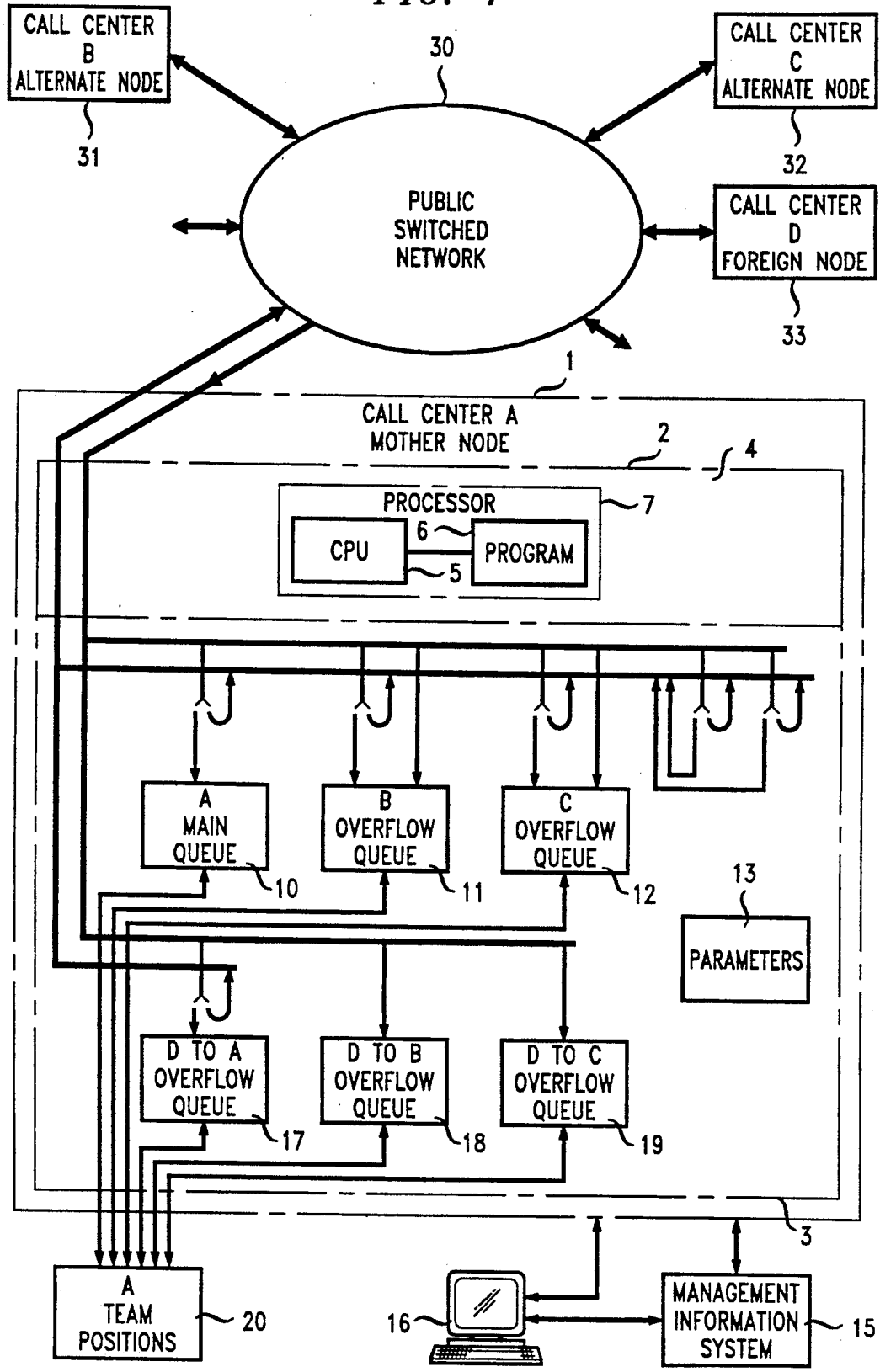
FIGS. 1 and 2 illustrate one of a group of four or more automatic call distributors arranged to overflow traffic within the group, the particular call distributor being arranged to act as a mother node for one of the call centers which is a foreign node.
Figure 2:
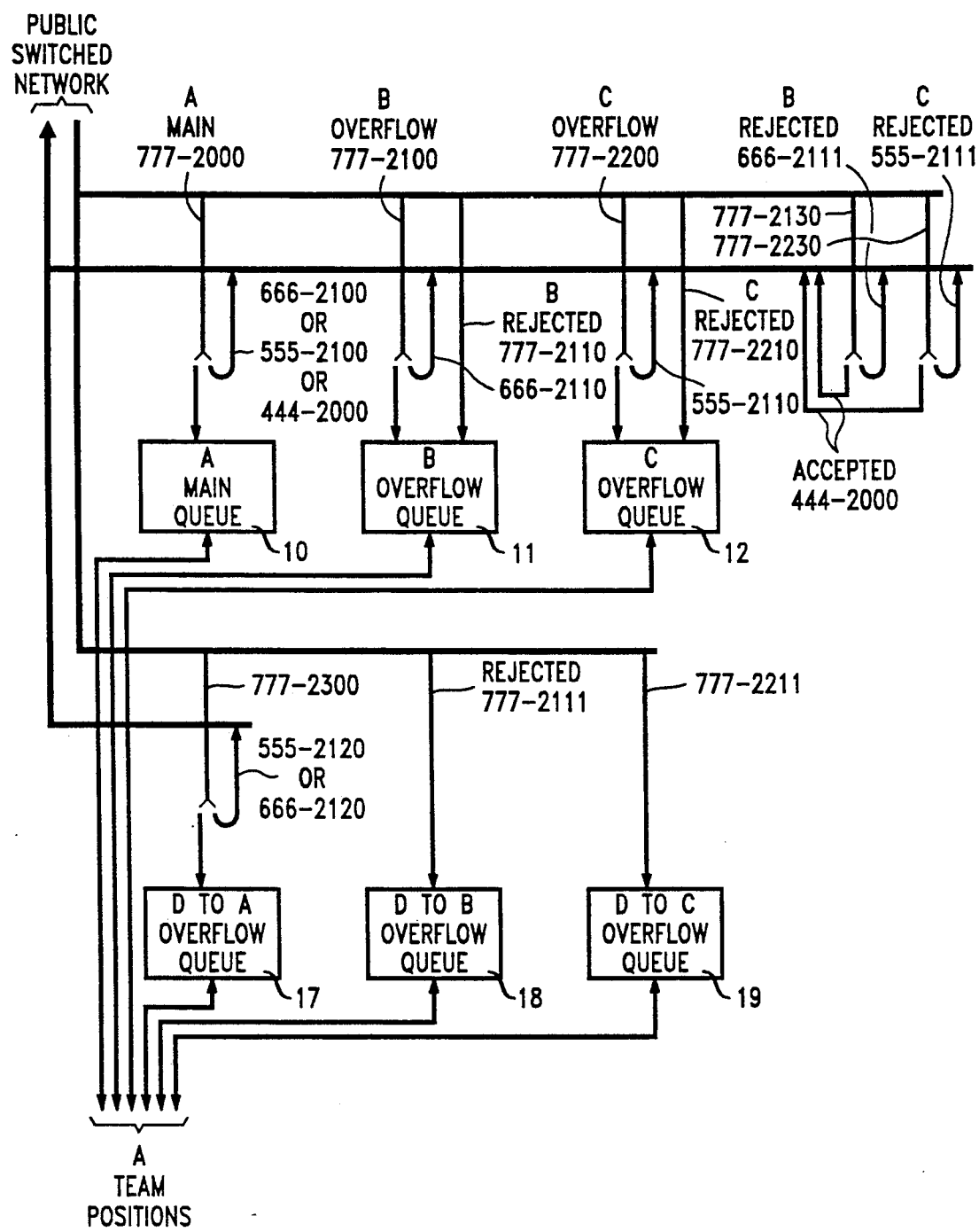

FIG. 1 shows an ACD, served by switching system (switch) 1 comprising a team of positions 20, the A team, which is one of four teams of positions that serves a particular customer. Details of which telephone number is used for which purpose are shown in FIG. 2. Two other teams, B and C, are connected via the public switched network 30 to switch 1. Team D is discussed further below. Switch 1 receives calls destined for the A team positions having one of five numbers: the main number 777-2000 for incoming traffic to the A team positions, the B team overflow number 777-2100 for traffic overflow from the B team targeted to the A team positions, the C team overflow number 777-2200 for traffic overflow from the C team targeted for the A team positions, 777-2110 for traffic originally rerouted from switch 1 but rejected by the switch controlling the B team positions, and 777-2210 for traffic originally rerouted from switch 1 but rejected from the switch controlling the C team. The latter two categories consist of calls originally having directory number 777-2000. If a call with the number 777-2000 comes into switch 1, it is examined within processor 2 comprising memory 3, of switch 1, the memory including the A main queue 10, the B overflow queue 11, and the C overflow queue 12. If the call can be served from the A team positions, then the call is entered into the A main queue 10. If not, the call is rerouted to an ACD serving center of either the B or the C team positions. In order to direct the call to the appropriate one of these ACD serving centers, the call is directed using a different number, 666-2100 and 555-2100 respectively for the B and C teams, for each such serving center. Overflow calls from the B or C centers rejected by call center A, are rerouted to the source center using directory numbers 666-2110 or 555-2110, respectively.

ACDs are well known in the prior art. The 5ESS Switch ACD is described in "5ESS Switch Pinnacle TM ACD Application Guide" and in "5ESS Switch Pinnacle TM ACD Marketing Application Guide" available from AT&T Network Systems.

The ACD is controlled by a program controlled processor 7 comprising a central processing unit (CPU)

5 and a program 6 stored in memory. Other portions of memory include block 3 which includes queues and parameters described below.

If the ACD serving center serving the A team wishes to overflow traffic to the B team positions, then it sends such traffic over the public switched network identified by a special directory number 666-2100 (comparable to the 777-2100 number in the reverse direction) to identify to the switch serving the B team that the call has been overflowed from the A team ACD. Before doing so, the overflow queue 11 for overflow traffic from the B team is examined to see if traffic can be overflowed to the ACD for the B team. A check is made of whether the number of calls in queue 11 (the queue for the B team) is equal to or less than some parameter X, stored in memory location 13. This parameter X in one specific embodiment is simply 0, i.e., calls will only be sent to alternate sites if there are no calls in the queue from a given alternate site. For other situations, a different parameter such as 1 or 2 may be used. This parameter is controllable by a system administrator of the automatic call distributor. If the number of calls in the queue for the B team ACD is less than or equal to X then the call is routed to the B team ACD, using the telephone number 666-2100. At the B team ACD, such a call, corresponding to a call to 777-2100 or 777-2200 arriving at call center A, is recognized as being a call overflowed from call center A. If that call is rejected, it is rerouted to call center A using telephone number 777-2110. Rejected phone calls are not further rerouted in this arrangement, in order to avoid any necessity for specifically identifying individual calls which is difficult if common channel signaling is not used.

If the call center B overflows traffic to call center A, the overflow traffic uses directory number 777-2100, which identifies the source as B. If the B overflow call would encounter excessive delay in call center A, the call is rejected and rerouted to call center B using directory number 666-2110, which identifies the rejected call to call center B as being a call rejected by call center A. Calls rejected from call center C are rejected using directory number 555-2110.

A management information system (MIS) 15 is attached to call center A to provide information about the load applied to and the service provided by call center A. MISs for ACDs are well known in the prior art. Performance of the group of ACDs can be monitored by sending data messages periodically among the MIS of the different members of the group. A system administrator accesses data from the MIS and controls parameters 13.

FIG. 1 also illustrates the use of queues for processing calls in the mother node (call center A) for calls overflowed from the foreign node (call center D, 33), to itself or to alternate nodes (call centers B, 31 or C, 32). The direct overflow traffic from the foreign node is identified by a special telephone number, in this case, 777-2300. Such traffic either goes directly into a D-overflow queue 17 or is stored in auxiliary queue 18 or 19 and further overflowed to call center B or call center C using directory numbers 666-2120 or 555-2120. These special numbers are used so that the call centers B and C can tell that this is traffic overflowed from the foreign node so that if they reject that traffic, they may reject it with a special telephone number and if they accept it, they will place it in an overflow queue for traffic from center D. If these call centers do reject such traffic it will be sent back by the public switched network using telephone numbers 777-2111 for overflow traffic rejected by call center B and 777-2211 for overflow traffic rejected from center C. Such rejected traffic which, it will be recalled, was originally sent to call center D, the foreign node, is stored in an auxiliary overflow queue for call center B, 18, or in an auxiliary overflow queue for call center C, 19.

The presence of call center D, the foreign node, also makes it possible for the mother node, call center A, to overflow its traffic, or overflow traffic from alternate nodes 31 and 32, using the main telephone number 444-2000 to call center D, the foreign node (33). The mother node 1 can recognize when it is possible to send its own overflow traffic to the foreign node by examining the number of entries in the D overflow queue 17 and the two auxiliary overflow queues 18 and 19. If the number of entries in all three of these queues is sufficiently small, then traffic may be overflowed to the foreign node, call center D (33). The mother node also receives calls from the alternate nodes, such as sites B and C, for overflow to the foreign node, which calls are either rejected by the mother node 1 or overflowed to the foreign node 33. The calls for overflow to the foreign node are identified by different telephone numbers, 777-2130 for calls from node 31, and 777-2230 for calls from node 32. If these calls are rejected, they are rejected with a special number, 666-2111 and 555-2111 for nodes 31 and 32, respectively, to notify these nodes that less overflow traffic should be sent to the foreign node 34 for a period of time.

Figure 3:
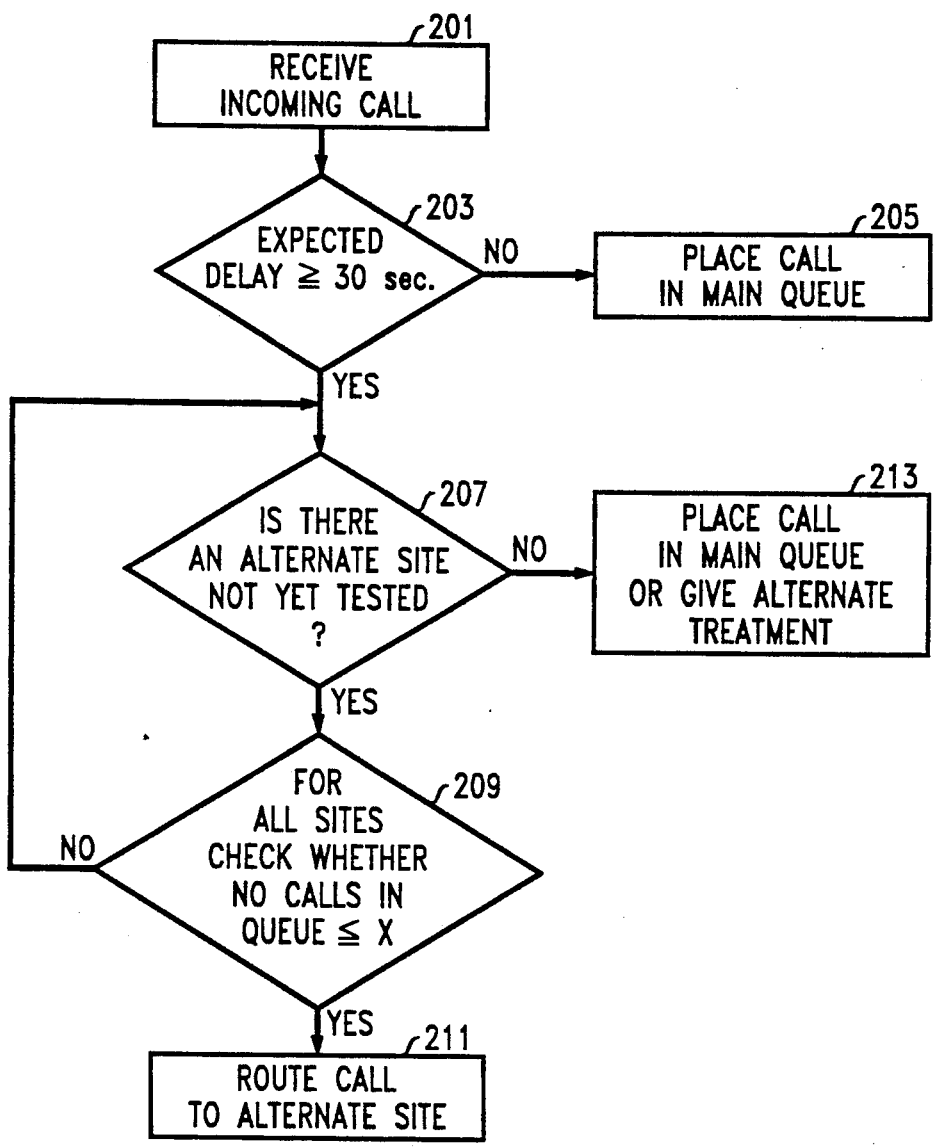
FIG. 3 is a flow diagram of the processing of an incoming call to one of these automatic call distributors other than the foreign node.

FIG. 3 illustrates the process of receiving a call. The call is received in the switch for serving the ACD (action block 201). While in this embodiment, this switch is part of a local switching system, in other embodiments it can be part of a separate PBX. Test 203 is used to determine whether the expected delay is equal to or greater than a parameter, in this example, 30 seconds. This parameter is controllable by an ACD system administrator. If not, the call is placed in the main queue (action block 205). If the delay is excessive, then the loop which includes test 207 and 209 is entered. Test 207 is used to check whether there are any alternate sites that have not yet been tested to see if traffic can be overflowed to that site. If there are untested sites, then test 209 is used to determine if the specific alternate site being tested has no more than X calls in the overflow queue for that site. If not, test 207 is reentered. If a given alternate site being tested has no more than X calls in its queue, then the incoming call is rerouted to that alternate site (action block 211).

The number X in the most straightforward implementation is 0. In this case, no traffic is overflowed to an alternate site which has traffic overflowed to this ACD. However, as experience is gathered, it may be desirable to make this number some small positive number, such as 1 or 2, especially for large ACD sites. The number is controllable by an ACD administrator. Calls are rerouted using an ACD reroute feature and a routing index. The routing index can specify a telephone number or a trunk group. Rerouting, which is well known in ACDs, differs from call forwarding in that a rerouted call can be terminated on any available agent position. The reroute feature in the Pinnacle system is called the Call Vectored Reroute feature. If the alternate site tested in test 209 has too many calls in its queue, then test 207 is reentered to try other alternate sites. After all alternate sites have been tested without finding any alternate site having sufficiently few entries in its queue, then the call is either placed in the main queue or given alternate treatment (action block 213). The alternate treatment might be busy signal or some special queue provided in the hope that the customer may be willing to wait a longer time.

Figure 4:
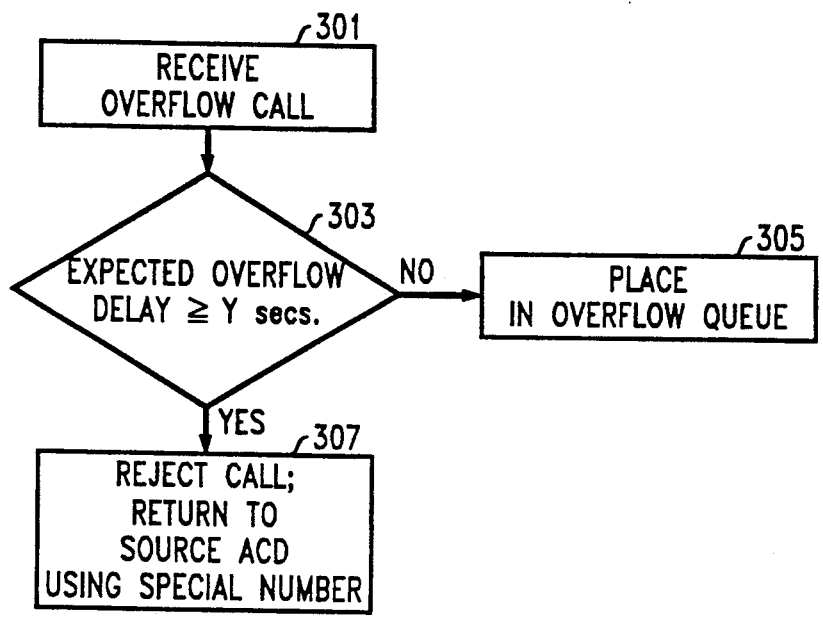
FIG. 4 is a flow diagram illustrating the processing of a call overflowed from another ACD which is not a foreign node.

FIG. 4 is a flow diagram of actions performed in response to receiving overflow traffic from one of the other ACD serving sites. As mentioned previously, such overflow traffic is identified by a different telephone number for identifying the source. An overflow call is received and its source identified (action block 301). Test 303 determines whether the delay in handling that overflow call is likely to exceed a threshold of, for example, Y seconds. Y is a parameter stored in block 13 of memory (FIG. 1). This threshold might be 25 seconds if the threshold for the main queue is 30 seconds to account for the fact that time has elapsed in routing the call from an original main number to an overflow ACD site. If the expected delay in serving that call is less than Y seconds, then the call is placed in the overflow queue associated with the transmitting ACD serving site (action block 305). If the expected overflow delay equals or exceeds Y seconds, then the call is rejected and is returned to the source ACD serving site using a special telephone number to identify that this is a rejected call and to identify the source (action block 307).

Figure 5:
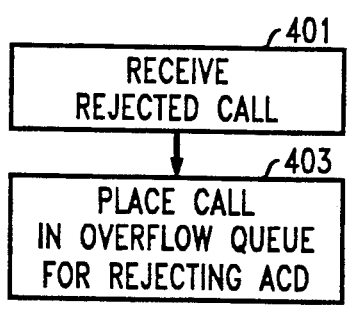
FIG. 5 is a flow diagram of the processing of a rejected call which was not overflowed from a foreign node.

FIG. 5 is a flow diagram describing the processing of rejected calls. If a rejected call is received and the rejecting source identified (action block 401), then the call is placed in the overflow queue for the ACD serving site that has rejected the call (action block 403). Note that block 403 corresponds to block 305, not block 301 (which uses a test before inserting the call into the queue).

In one simple implementation of applicants' invention (test 209, FIG. 3), the presence of overflow and rejected calls yields the same result, i.e., a refusal to overflow calls to the ACD serving site associated with that queue if more than X calls have been rejected by or overflowed from that site. In alternative arrangements, the decision on whether or not to use a particular alternate destination can be based on one threshold for rejected calls from that destination and a second different threshold for calls overflowed from that destination, or on some combined threshold based on different weighting of the two types of calls.

As stated above, this arrangement also processes calls which are originally received in an ACD site which has not been adapted according to the principles of the invention, i.e., a foreign node. Overflow traffic from such an ACD is received in a mother node which further distributes this traffic to other ACD sites which have not yet received an excessive amount of overflow traffic.

Figure 6:
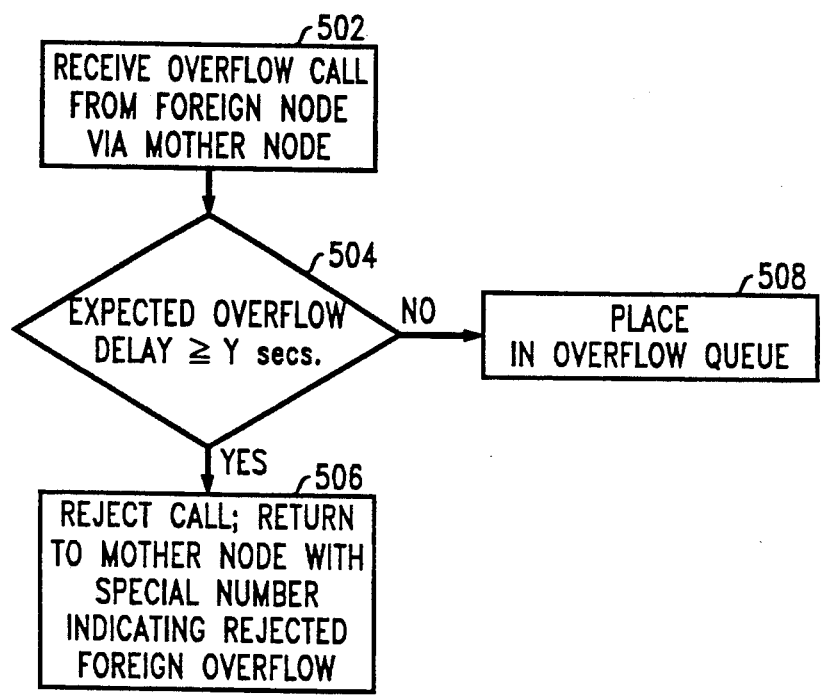
FIG. 6 is the processing of a call in a node other than the mother node of a call overflowed from the foreign node via the mother node.

FIG. 6 illustrates the actions performed in the alternate sites such as call center B and call center C for handling traffic overflowed from the foreign node. An overflow call is received from the foreign node via the mother node (action block 502). In the alternate site a test is made to see if the expected overflow delay is equal to or greater than Y seconds (test 504). If not, the call is placed in the overflow queue for the foreign node in that alternate site. If the expected overflow is equal to or in excess of Y, then the call is rejected. It is returned over the public switched network to the mother node using a special directory number such as 777-2111 for call center B and 777-2211 for call center C in order to direct these calls to the special auxiliary overflow queues 18 or 19 for rejected traffic originally overflowed from the foreign node.

Figure 7:
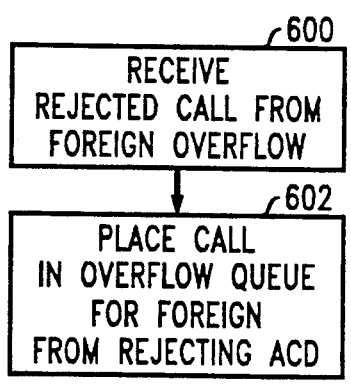
FIG. 7 is a flow diagram of the processing of a call overflowed from the foreign node via the mother node and rejected by one of the alternate nodes.

FIG. 7 illustrates the actions taken in the mother node for processing overflow traffic from the foreign node that was rejected in one of the alternate sites such as call center B or call center C. The rejected call originally overflowed from the foreign node is received (action block 600). The call is then placed in the overflow queue for overflow traffic from a foreign node for the rejecting ACD (action block 602) such as queue 18 or 19.

Figure 8:
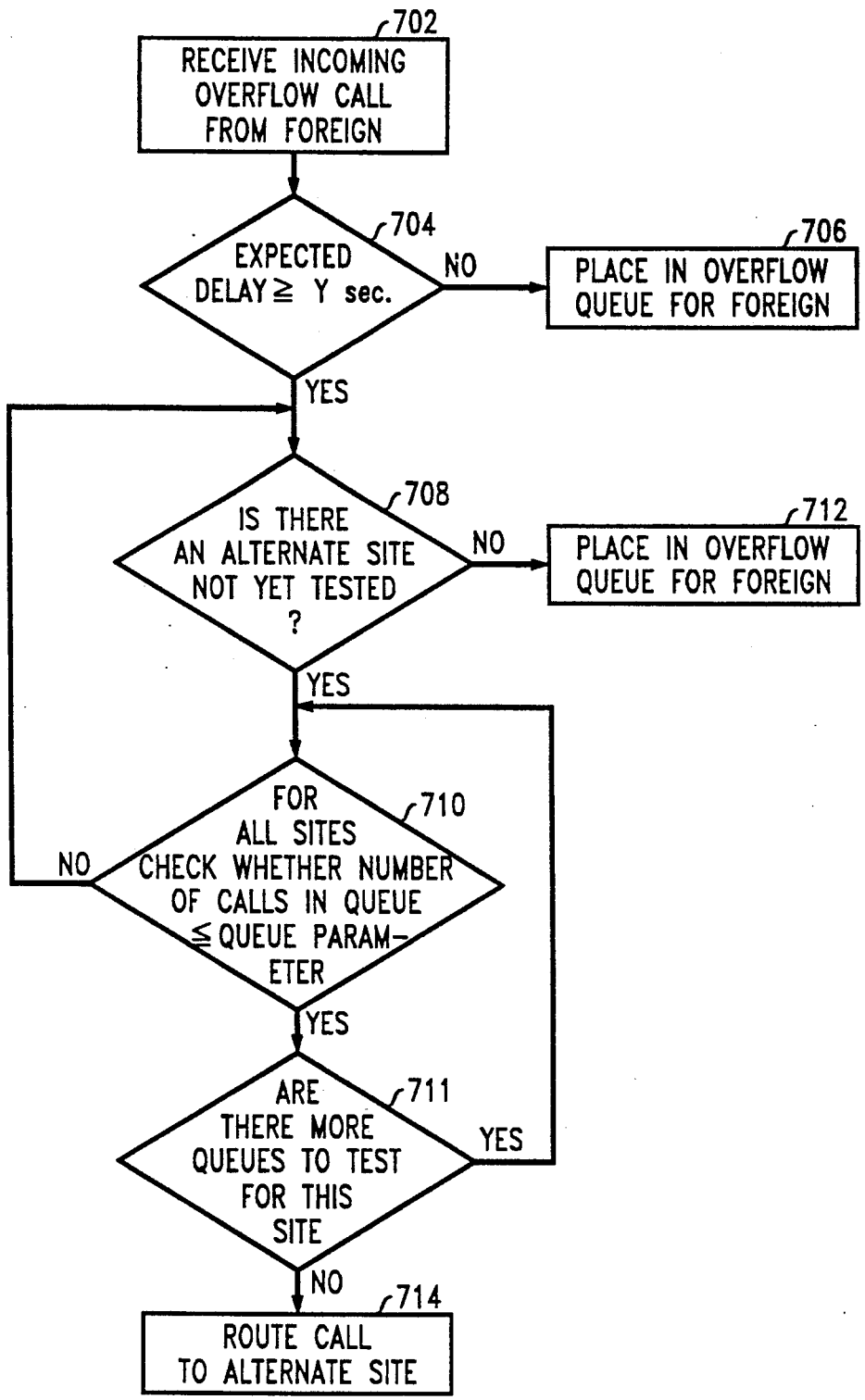
FIG. 8 is a flow diagram of the processing in the mother node of a call overflowed from a foreign node.

FIG. 8 illustrates the actions performed in the mother node for overflow traffic received from the foreign node. The mother node receives incoming overflow call from the foreign node (action block 702). Test 704 is used to determine whether the delay in processing such a call equals or exceeds Y seconds. If not, then the call is placed in the overflow queue for the foreign node (action block 706). If the delay is excessive, then the loop of tests 708, 710, and 711 is entered. In this loop, test 708 determines if there is an alternate site which has not yet been tested as a possible candidate for handling the overflow call from the foreign node. Test 710 is used to determine whether the number of calls in an overflow queue for that site equals or exceeds a queue parameter. If the queue parameter is not exceeded, other queues (test 711) for that alternate site are tested (test 710). If a site is found which has not yet accepted an excessive amount of overflow traffic, then the call is routed to that site (action block 714). If no such site is found, i.e., if all alternate sites have been tested and have had negative results of test 710, then the call is placed in the overflow queue of the mother node for the foreign node (action block 712). This is overflow queue 17, FIG. 1.

The order in which alternate nodes and the mother node are checked as candidates for handling the overflow traffic from the foreign node can be administered, using data in the parameters section 13 (FIG. 1) of the mother node.

Traffic rejected from the foreign node cannot be distinguished from traffic overflowed from the foreign node. This is not too important since the mother node tries to reroute the overflowed traffic anyway and such attempts for the relatively rare rejected call should not distort performance substantially. Rejected calls should be rare since the mother node would not send calls to the foreign node if the foreign node had generated a large volume of overflow traffic.

For routing traffic from an alternate site to the foreign node, the sequence of FIG. 3 is followed, since the alternate site has a queue for traffic overflowed from the foreign node to help test whether the call may be so routed. If a decision is made to route the call to the foreign node, this is done by sending the call to the mother node with the special number, such as 777-2130 or 777-2230, to signify that the call should be forwarded to the foreign node. Such a special number is easily derived from a routing index.

In an alternative embodiment, the alternate nodes can treat the mother node and the foreign node as a single entity, and the mother node can make the decision as to whether it or the foreign node should handle overflow traffic received from an alternate node.

While in this implementation, only one foreign node is shown, the same principles can be used for several foreign nodes, served by one or more mother nodes.

The priority of the overflow queues and the main queue is different in order to allow overflow queue entries to be processed more rapidly since overflow queue entries have already encountered delay before entering a queue. Techniques for giving different queues different priorities are well known in the prior art. The system administrator can alter queue performance by specifying parameters, stored in memory locations 13, for controlling the queues.

While this specific embodiment is of an Automatic Call Distributor, any other arrangement for distributing calls to serving agents, such as a Uniform Call Distributor, can also use this arrangement. This invention therefore applies to all types of call distributors (CDs).

It is to be understood that the above description is only of one preferred embodiment of the invention. Numerous other arrangements may be devised by one skilled in the art without departing from the scope of the invention. The invention is thus limited only as defined in the accompanying claims.

I claim:

1. A method of serving calls to a customer having a plurality of call distributor (CD) serving centers, comprising the steps of:
   receiving, in a first of said centers a call rerouted from a second of said centers;
   determining whether an excessive number of calls have been previously rerouted to said first center from an alternate center other than said second center, said excessive number indicating inability to handle additional calls without unacceptable delay in said alternate center, and
   if an excessive number of calls has not been rerouted from said alternate center, rerouting said call to said alternate center;
   wherein overflow calls are automatically rerouted to an alternate center which is not likely to be overloaded without requiring any call routing control messages, reflecting a level of busyness of a serving center, to be transmitted among said plurality of serving centers.

2. The method of claim 1 further comprising the steps of:
   responsive to a determination in said alternate center that said call cannot be handled without unacceptable delay, rejecting said call in said alternate center;
   responsive to said rejection, rerouting said call back to said first center, and
   responsive to receiving the rejected call from said alternate center, serving said rejected call from said first center.

3. The method of claim 1 wherein said determining whether an excessive number of calls have been rerouted comprises:
   testing whether more than a predefined number of unserved calls in said first center have been rerouted from said alternate center.

4. The method of claim 3 wherein said first center has overflow queues for ones of said plurality of CD serving centers and wherein said determining an excessive number of calls comprises determining how many calls are in an overflow queue for said alternate center.

5. The method of claim 1 wherein said rerouting comprises rerouting over a public switched network.

6. The method of claim 5 wherein said rerouting over a public switched network comprises rerouting over said network using a telephone number different from a main telephone number for said alternate center.

7. The method of claim 1 further comprising the steps of:
   responsive to receiving said call rerouted from said second of said centers, and prior to the step of determining whether an excessive number of calls have been rerouted, testing whether delay for serving said call in said first center is expected to exceed a first threshold; and
   responsive to determining that said first threshold is not expected to be exceeded, serving said call in said first center.

8. The method of claim 1 further comprising:
   receiving in said first center a call from one of said alternate centers;
   determining in said first center whether an excessive number of calls originally received in said first center or in one of said alternate centers have been rerouted to said second center from or via said first center; and
   if an excessive number of calls has not been rerouted to said second center from or via said first center, rerouting said call received from said alternate center to said second center.

9. The method of claim 8 wherein said call from one of said alternate centers is designated for service by said second center.

10. The method of claim 8 wherein if an excessive number of calls has been rerouted to said second center, rejecting said call received from one of said alternate centers.

11. A first call distributor (CD) comprising:
    queue means for storing calls rerouted into said first CD from a group of other alternate CDs;
    means responsive to receipt of a call overflowed from a second CD, said second CD not in said group, for examining said queue means to identify one of said alternate CDs which has overflowed relatively few calls to said first CD, said relatively few calls indicating ability to handle additional calls without excessive delay in said one of said alternate centers; and
    means responsive to said examining means identifying one of said alternate CDs for rerouting said call to the identified CD;
    wherein overflow calls are automatically rerouted to an alternate CD which is not likely to be overloaded without requiring any call routing control messages, reflecting a level of busyness of a CD, to be transmitted among said first CD and said group of other alternate CDs.

12. The first CD of claim 11 wherein said means for examining comprises means for testing whether any unserved calls in said first CD have been rerouted from a candidate for identification as said identified CD.

13. The first CD of claim 12 wherein said means for examining further comprises means for testing how many calls have been overflowed into said first CD from ones of said alternate CDs.

14. The first CD of claim 11 wherein said means for rerouting comprise means for rerouting over a public switched network.

15. The first CD of claim 11 further comprising:
    means for estimating whether expected delay, in serving in said first CD an incoming call received in said first CD, exceeds a threshold;

means for serving in said first CD said call received in said first CD if said delay is less than said threshold;

means, responsive to an estimation that said delay exceeds said threshold, for examining a queue for storing calls rerouted from said second CD to said first CD to determine if an excessive number of calls has been so rerouted; and said excessive number indicating inability to handle additional calls without unacceptable delay in said second CD;

means responsive to a determination that an excessive number has not been rerouted for routing said incoming call to said second CD.

16. The first CD of claim 11 further comprising:

means for estimating whether expected delay in serving said call overflowed from said second CD exceeds a threshold; and means responsive to said means for estimating for serving said call if said delay does not exceed said threshold.

* * * * *